United States Patent [19]

Nesher

[11] Patent Number: 4,610,706
[45] Date of Patent: Sep. 9, 1986

[54] HEPA FILTER WITH INTEGRAL SEPARATORS

[76] Inventor: Alexander G. Nesher, 216 Fitzwilliam La., Rosemont, Pa. 19010

[21] Appl. No.: 654,328

[22] Filed: Sep. 25, 1984

Related U.S. Application Data

[63] Continuation-in-part of Ser. No. 463,527, Feb. 3, 1983, abandoned, which is a continuation-in-part of Ser. No. 322,414, Nov. 18, 1981, abandoned.

[51] Int. Cl.$^4$ .............................................. B01D 46/10
[52] U.S. Cl. ......................................... 55/497; 55/521
[58] Field of Search ................ 55/497, 500, 521, 527, 55/529; 210/287, 493.1, 493.3, 493.5

[56] References Cited

U.S. PATENT DOCUMENTS

| | | | |
|---|---|---|---|
| 3,280,985 | 10/1966 | Czerwonka | 55/521 X |
| 3,386,227 | 6/1968 | Czerwonka | 55/521 X |
| 3,410,062 | 11/1968 | Hart | 55/500 X |
| 3,531,920 | 9/1966 | Hart | 55/497 |
| 3,799,354 | 3/1974 | Buckman et al. | 55/521 X |
| 4,199,387 | 4/1980 | Hladik | 55/497 X |
| 4,310,419 | 1/1982 | Nara et al. | 55/521 X |

FOREIGN PATENT DOCUMENTS

| | | | |
|---|---|---|---|
| 745466 | 5/1933 | France. | |
| 798765 | 12/1956 | United Kingdom. | |
| 0840757 | 7/1960 | United Kingdom | 210/493.1 |

Primary Examiner—Charles Hart
Attorney, Agent, or Firm—Z. T. Wobensmith, III

[57] ABSTRACT

A HEPA filter is disclosed which includes an outer frame which encloses a filter assembly that includes a plurality of horizontally corrugated panels with alternate flat integral separator panels folded therebetween all formed from a continuous sheet or strip of filter media, and with vertical crease lines providing for folding the panels.

7 Claims, 8 Drawing Figures

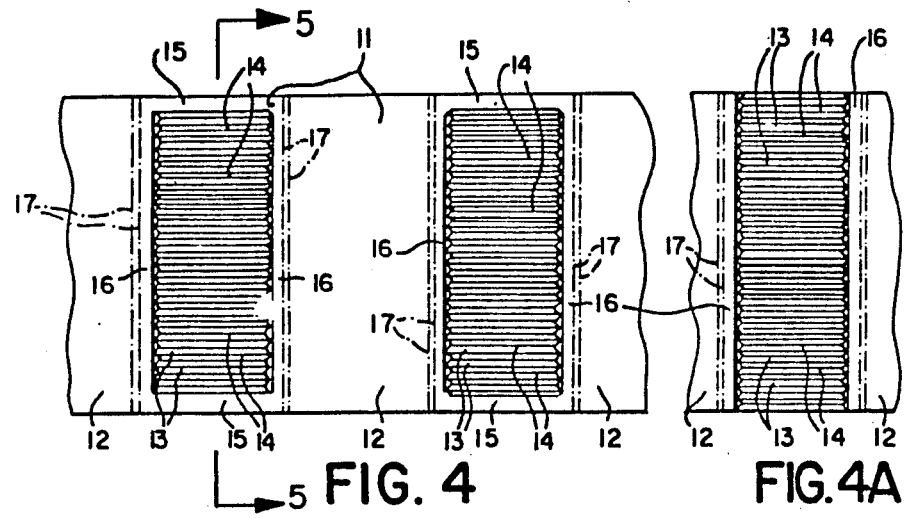
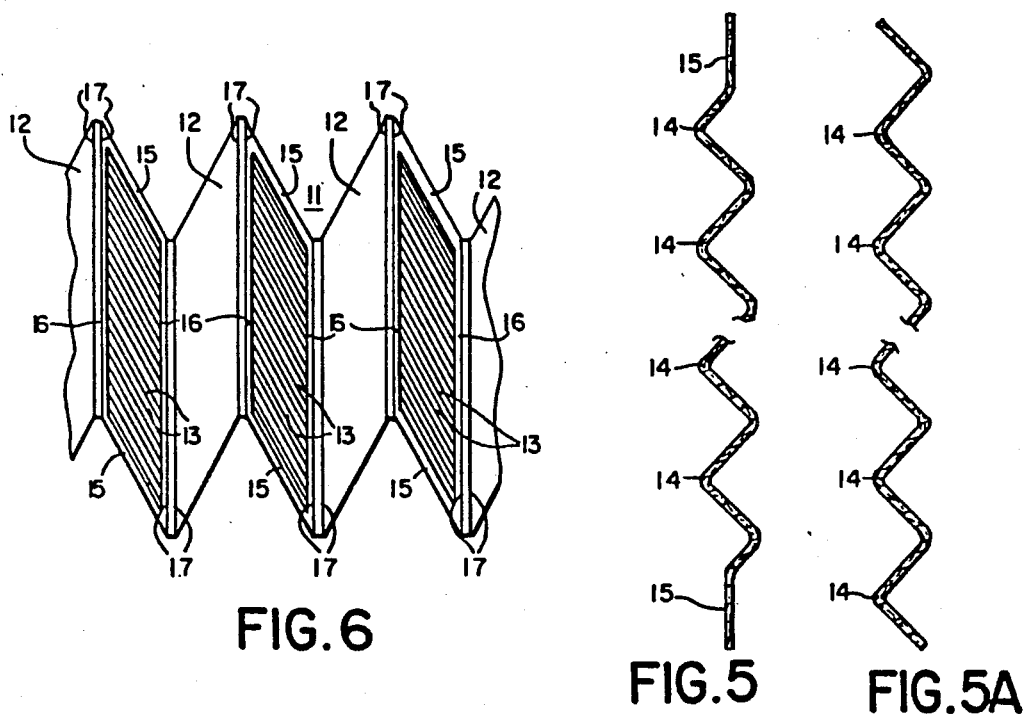

HEPA FILTER WITH INTEGRAL SEPARATORS

CROSS REFERENCE TO RELATED APPLICATIONS

This application is a continuation-in-part of my prior application for HEPA FILTER WITH INTEGRAL SEPARATORS filed Feb. 3, 1983, Ser. No. 463,527 and now abandoned, which is a continuation-in-part of my prior application filed Nov. 18, 1981, Ser. No. 322,414 and now abandoned.

BACKGROUND OF THE INVENTION

1. Field of the Invention

This invention relates to HEPA or high efficiency particulate air filters of the laminar flow type, and more particularly to improvements thereof which comprise integral separators between folded filter panels.

2. Description of the Prior Art

High efficiency particulate air filers or HEPA filters as known today, have been on the market for approximately thirty years, and are extensively used in major industries, including the atomic, semi-conductor, space, chemical and pharmaceutical industries, and for health care including operating rooms and other clean air facilities. These filters generally consist of a pleated fiber glass element cemented into a frame, and with the pleats separated for free air passage by separators.

It has heretofore been proposed to provide various types of interposed separators between filter elements which are made of corrugated aluminum, kraft paper or synthetic plastic materials.

It has also heretofore been proposed to provide dimples to serve as separators.

It has also been proposed to corrugate the entire filter media and then fold the material back and forth across the corrugations.

It has also been proposed to provide a plurality of geometrical configurations to provide separation but none of these provide laminar or turbulence free air flow.

British Pat. No. 798,765 in FIG. 1 discloses a panel which is expressly stated as not requiring separate spacers between the filter sheets to hold them apart. As shown in FIG. 1, the filter strip has a checkerboard appearance with spacers formed integrally with the filter sheets themselves so that when the strip is folded the corrugations engage flat surfaces to retain the separations but do not produce laminar or turbulence free air flow.

Czerwonka, in U.S. Pat. No. 3,280,985 discloses a fluid filter arrangement, wherein the filter media includes alternating finer and more porous filter medium positioned in coextending faced relationship, and separated by ribs, as a unit in pleat form, to extend across a dirty gas stream to be treated. No alternating filter arrangement like my invention is disclosed in Czerwonka nor would it produce a laminar or turbulence free air flow.

Czerwonka, in U.S. Pat. No. 3,386,227 discloses an electrostatic filter device in which the filter sheets 7 are of porous, dielectric materials and with separator sheets of electrically conductive material, but which also does not provide a laminar or turbulence free air flow, nor can it be used for clean rooms and in clean air equipment.

Hart, in U.S. Pat. No. 3,410,062 discloses a filter wherein the filter media is composed of a stack of panels with each panel provided with V corrugations, which provide extra filter area and space the panels.

No structure similar to my invention is disclosed, and which provides for laminar and turbulence free air flow through the filter.

Hart, in U.S. Pat. No. 3,531,920 discloses a filter which has a core composed of a zig-zag series of self-sustaining planar panels, connected by alternate upstream and downstream folds, with the folds spaced to provide V shaped pockets for the air to enter and V shaped pockets for filtered air to leave.

No structure similar to my invention is disclosed in Hart, and which provides for laminar and turbulence free air flow.

Buckman et al., in U.S. Pat. No. 3,799,354 discloses a filter element, which is formed from a strip of sheet filter material folded in zig-zag fashion about a center tube, with alternate pleats so as to provide a larger area of filter paper in the same space as a conventional star form filter element. No structure is disclosed in Buckman et al. which provides for laminar or turbulence free air flow. In addition, the Buckman et al. structure discloses a hollow tubular filter which is suitable for special purposes and not designed for use with clean rooms or clean room equipment.

Hladik, in U.S. Pat. No. 4,199,387 discloses a method of cementing filter media to a frame for high temperature applications, but does not provide a structure with the characteristics of my invention or that provides for laminar or turbulence free air flow.

The French Pat. No. 745,466 discloses the joining of individual panels A using channels C, which does not provide an integral structure nor one with laminar or turbulence free air flow.

The HEPA filter of my invention can be fabricated from a continuous strip of filter material with integral separators, which avoids the problems of previous structures while permitting the use of a larger sheet of filtering material thus increasing the overall filtering surface, thereby allowing for a higher volume of air to flow through the filter at a relatively lower pressure drop, with laminar and turbulence free air flow.

SUMMARY OF THE INVENTION

In accordance with the invention a high efficiency particulate air or HEPA filter is provided formed from a continuous band or sheet of filtering media, which is folded into panels and the panels kept apart for free air passage by alternately fabricated corrugations in the panels, with flat panels therebetween, all of the same filtering material.

It is the principal object of the invention to provide a HEPA filter with improved performance and which is of simplified construction.

It is a further object of the invention to provide a HEPA filter which does not require a plurality of interposed corrugated separators.

It is a further object of the invention to provide a HEPA filter in which the laminar flow characteristics are improved and in which the filter construction enhances its mechanical strength.

It is a further object of the invention to facilitate cementing of the filter element to the frame, and thereby to improve bonding between the filter element and the frame thus eliminating the possibility of air by-pass.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 4 is a view of the filtering sheet or media in the flat showing the details of the filter panel construction;

FIG. 4A is a view in the flat illustrating a modified form of the filtering sheet or media in which the corrugations extend to the top and bottom of the corrugated sheet;

FIG. 5 is a fragmentary vertical sectional view, enlarged, taken along the line 5—5 of FIG. 4;

FIG. 5A is a sectional view similar to FIG. 5, but illustrating the same construction as FIG. 4A; and FIG. 6 is an elevational view of a portion of the filter sheet in partially open condition, showing the design and construction details of the folded filter sheet.

Figure 1:
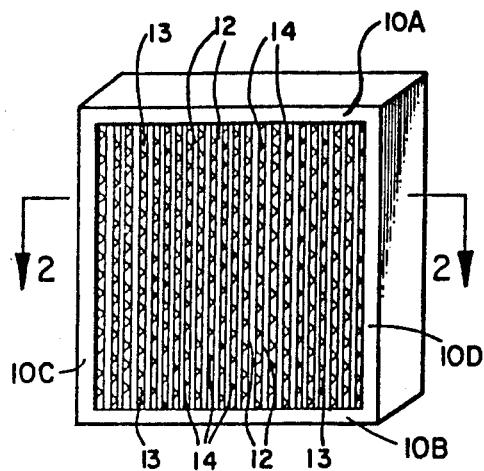
FIG. 1 is a view in perspective of a filter in accordance with the invention.

It should, of course, be understood that the description and drawings herein are illustrative merely and that various modifications and changes can be made in the structure disclosed without departing from the spirit of the invention.

DESCRIPTION OF THE PREFERRED EMBODIMENTS

Referring now to the drawings, and more particularly to FIGS. 1 to 4, 5 and 6, a filter in accordance with the invention is therein illustrated, which includes an outer enclosing frame or supporting structure 10, open at the front and at the rear, which may be of wood or metal, depending upon the specific field of use. The frame 10 has upper and lower panels 10A and 10B and side panels 10C and 10D in enclosing relation to the structure therein. The frame 10 as a supporting structure for the filter media can be disposed in any preferred orientation with reference to the corrugations or panels to be described.

Within the outer frame 10 a filter assembly 11 is provided, which can be of any suitable material and for which expanded fiber glass is particularly suitable.

The filter assembly as seen in detail in FIG. 6, is composed of alternating separator panels 12 and corrugated panels 13, the panels 12 are separator panels preferably flat and uninterrupted, and the panels 13 are preferably provided with horizontal corrugations 14 interiorly of their horizontal margins 15, and with vertical margins 16. While the size of the corrugations 14 may be varied as desired it has been found that three to five corrugations per inch is satisfactory.

Figure 3:
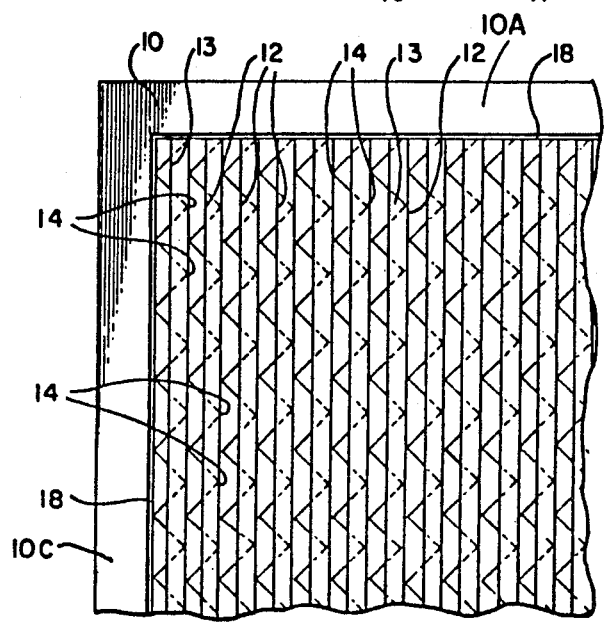
FIG. 3 is a fragmentary view, in elevation, showing the details of construction of the filter with its integral corrugated separators.

Between the panels 12 and 13 two crease or fold lines 17 are provided to facilitate the folding, initially as shown in FIG. 6 and then as shown in FIG. 3 where the apices of the corrugations 14 contact opposite faces of the flat panels 12.

The filter assembly 11, in folded condition as shown in detail in FIG. 3, may be cemented in place within the outer frame 10 in a conventional manner, by fire retardant polyurethane foam and rubber base adhesive 18. The frame 10, as described above, provides for secure mounting and clamping of the filter assembly 11 so that all air by-pass around the filter assembly 11 is eliminated.

If metal is employed to construct the frame 10 it can be of aluminum, galvanized or stainless steel depending upon the requirements. If wood is employed to construct frame 10 it can be composition board or plywood, treated if necessary, to be fire retardant.

Referring now more particulary to FIGS. 4A and 5A a modified form of the invention is illustrated, in which the corrugations 14 extend to the top and bottom of the panel 13, which may be desirable in some applications.

The filter assembly 11 is simple to construct using suitable dies, and the completed filter may be easily assembled and inserted into the frame 10 for final assembly and subsequent use.

Figure 2:
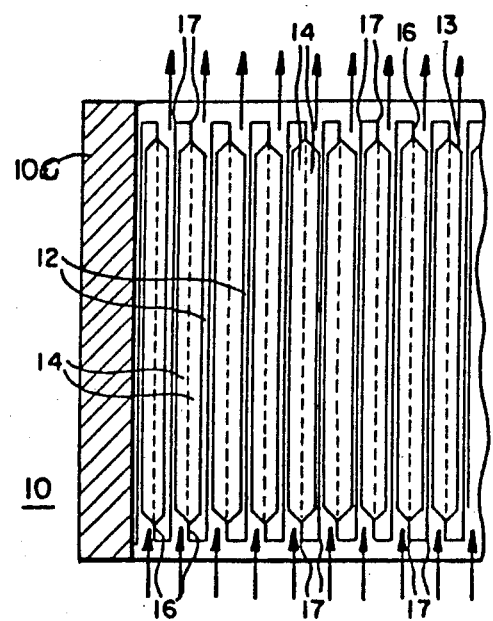
FIG. 2 is a horizontal sectional view taken along the line 2—2 of FIG. 1.

It has been determined that the completed filter has high performance characteristics with laminar flow at the downstream side as shown in FIG. 2, and which complies with Class 100 requirements of Federal Standard 209B which relates to filters.

It will thus be seen that filters have been provided in accordance with the objects of the invention.

I claim:

1. A HEPA filter with provides laminar and turbulence free air flow which comprises
   an outer frame,
   a filter assembly carried within said frame,
   said filter assembly is of filtering material in continuous strip form with a continuous succession of alternating flat panels and corrugated panels of the same size,
   said corrugated panels having V-shaped horizontal corrugations extending across the panels and vertical margins extending along said corrugations, and with crease means between the flat panels and the vertical margins of the corrugated panels for folding said panels.

2. A filter as defined in claim 1 in which said crease means comprise two vertical crease lines.

3. A filter as defined in claim 1 in which said crease means are disposed in flat portions of said filter element and are spaced from each other by the corrugated panels.

4. A filter as defined in claim 1 in which said corrugated panels are provided with horizontal margins along said corrugations.

5. A filter as defined in claim 1 in which said filter assembly is of fiber glass.

6. A filter as defined in claim 1 in which said filter assembly consists of a continuous sheet of expanded fiber glass with an increased filtering surface.

7. A filter as defined in claim 1 in which said filter assembly is cemented to said frame.

* * * * *